Jan. 31, 1950            E. LABIN ET AL            2,495,740
MAGNETOSTRICTIVE TIME DELAY DEVICE
Filed July 9, 1945            2 Sheets-Sheet 2
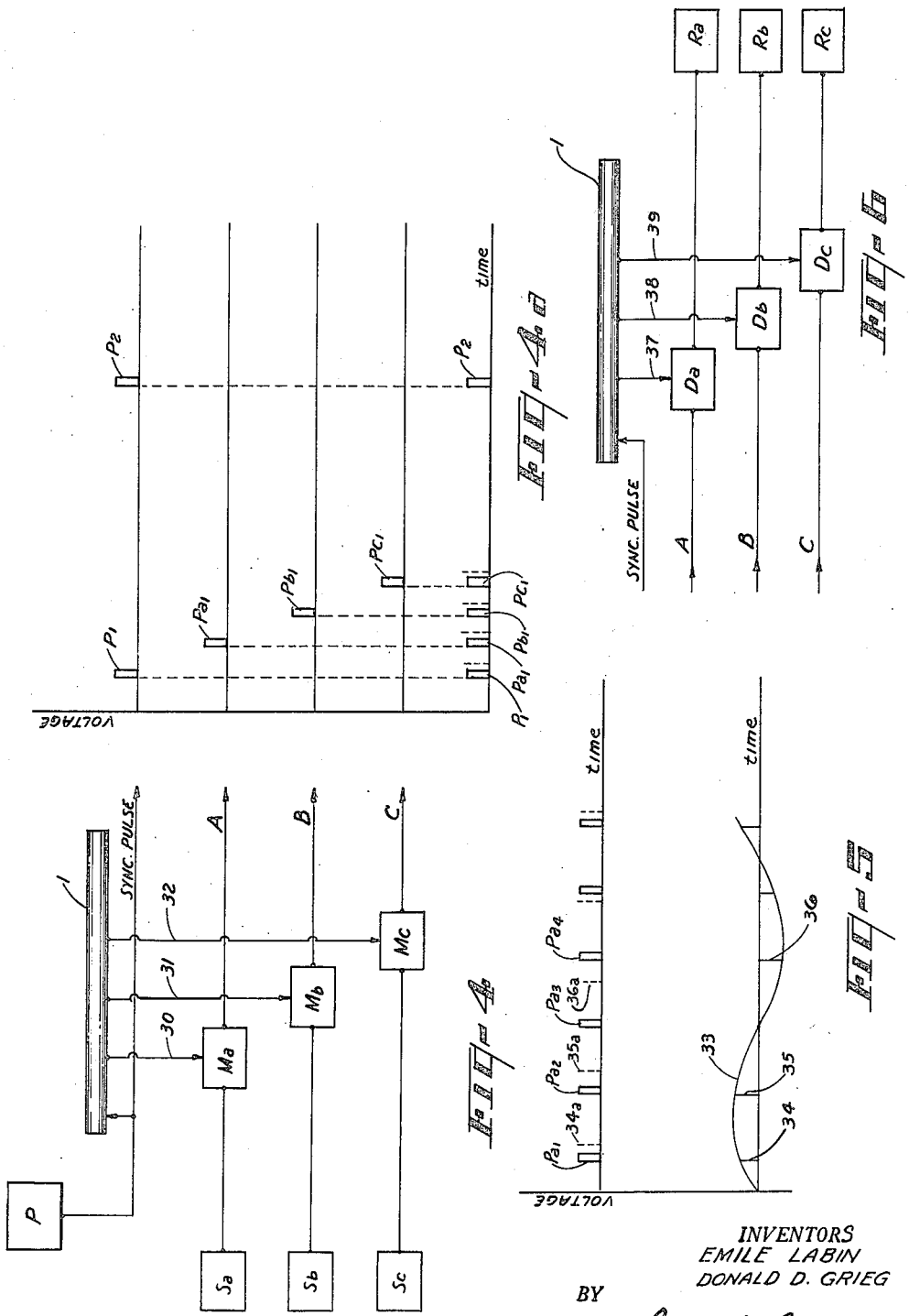
INVENTORS
EMILE LABIN
DONALD D. GRIEG
BY
ATTORNEY Patented Jan. 31, 1950

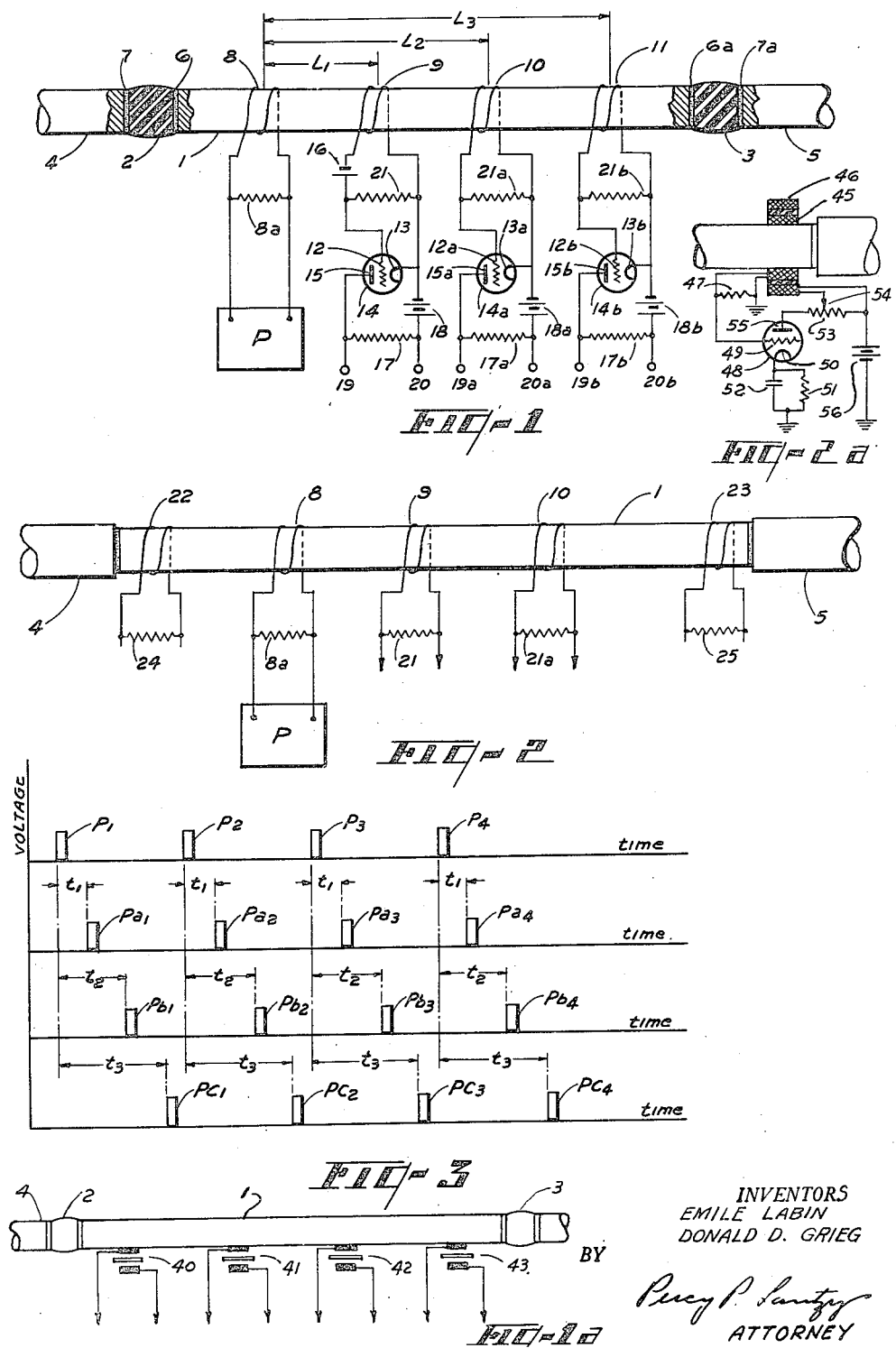

2,495,740

UNITED STATES PATENT OFFICE 2,495,740

MAGNETOSTRICTIVE TIME-DELAY DEVICE

Emile Labin, New York, and Donald D. Grieg, Forest Hills, N. Y., assignors to Federal Telephone and Radio Corporation, New York, N. Y., a corporation of Delaware Application July 9, 1945, Serial No. 603,952

1 Claim. (Cl. 178—44)

This invention relates to time delay devices and more particularly to delay devices adapted to be incorporated into electrical systems for repeating wave impulses with predetermined time delays. The object of this invention is to provide such a delay device applicable for use in electrical systems, the device being of a simple character which does not involve expensive and cumbersome electrical or other elements or equipment.

In the transmission of electrical wave energy or impulses, it is frequently desirable to introduce for particular purposes a time delay of the transmission. There have heretofore been known and proposed various kinds of delay systems or networks, some of which involve electrical elements, and others of which involve acoustical or mechanical elements or arrangements.

Such systems heretofore used for producing time delay have in many applications been cumbersome and expensive for the purpose of producing the delays desired. In accordance with our invention, we have produced a relatively simple arrangement for producing time delays, which involves the use of the magneto-striction property of an electro-magnetic member. This property of a magnetic member is known in the art, and is characterized by physical changes of dimension in correspondence with changes of the magnetic flux density. When the magneto-striction producing force is applied at a point on the magnetic member, the change of physical dimension does not occur simultaneously throughout the member but rather, the change of dimension travels throughout the extent of the member, at a rate of travel which approximates the velocity of sound in the material. When the change of dimension reaches some other point of the member it produces at a suitable receiving element there a corresponding voltage.

According to our invention, we make use of the foregoing unique magneto-striction property of a magnetic member to provide the desired delay. We carry out our invention by introducing the wave energy which is to undergo the delay, to a point of the magneto-striction member; and then taking the energy from a different point or points of the member. This is conveniently done by placing an input coil in magnetic relation with a rod or bar of the magnetic material at a desired point; or alternatively some other type of coupling device may be used in place of a coil, for example a piezoelectric element. When an electrical impulse or wave is imposed on the input coil or element, a corresponding flux is generated in the magnetic member, producing the physical change of its dimension. This physical change will travel down the rod as heretofore described. We take energy from the rod by locating a receiving element such as a receiving coil or piezoelectric element at a spaced distance from the input element. The flux in the rod will thus induce a voltage in the receiving element which is a replica of the voltage impressed on the input element and will be delayed in time with respect to the voltage impressed on the input element in accordance with the time required for the magneto-striction change of dimension to move from the input element, down the rod to the receiving element.

A feature of our invention is that our device is especially adapted for producing a plurality of received signals, each with a different time delay. This is done by use of a plurality of receiving elements each spaced a different predetermined distance from the input element. Thus there will be obtained at each receiving element a voltage which is a replica of the input voltage but of successively increasing delays of arrival.

Another feature of our invention resides in a manner of damping or absorbing the magneto-striction energy at the ends of the magnetic member to prevent undesirable reflection back into the member.

Use may be made of these delayed waves or impulses in any way desired. A convenient way is to impress the voltage from the receiving coils on a suitable electronic tube circuit in a well known manner.

Our delay device may have any of a number of applications. A particular application for the device is in multiplex signal transmission of the type wherein a series of pulses extremely short in duration and of high frequency are transmitted and modulated to convey the signal intelligence. In multiplex transmission, it is desired to repeat several series of the pulses at different times. By use of our device, we are able to take from the receiving coils a corresponding number of series of pulses delayed in accordance with the delay determined by the position of the respective receiving coils along the magnetic member.

The foregoing and other features and advantages and applications of our invention will be better understood from the following detailed description taken in conjunction with the accompanying drawings of which:

Fig. 1 shows a magneto-striction device according to our invention;

Fig. 1a shows a modified arrangement for the device of Fig. 1;

Fig. 2 shows a modified form of magnetostriction device according to our invention;

Fig. 2a shows a modification of the arrangement shown in Fig. 2;

Fig. 3 shows graphically the time delays provided for electrical pulses by use of a device according to our invention;

Fig. 4 illustrates a multiplex signal transmission system utilizing a device according to our invention;

Fig. 4a illustrates graphically the time delays of pulses used in the system of Fig. 4;

Fig. 5 shows graphically a form of modulation in the system of Fig. 4; and

Fig. 6 shows a multiplex receiving system adapted to receive signals from the transmission system of Fig. 4, the receiving system employing a device according to our invention.

Fig. 1 shows rod or bar 1, preferably of circular cross-section of a magnetic material such as iron or steel, adapted for use as a magnetostriction type of rod. When polarized it has the property of undergoing mechanical variation of its physical dimensions, that is, elongation and contraction, with change of magnetic flux through it. Thus the application of an electric pulse or wave to a coil related to the rod will produce the magneto-stricken effect; and this mechanical effect or deformation will be propagated as a wave along the rod at a velocity approximating that of sound through air.

The rod is supported at its ends by supports 2 and 3, which in turn are mounted to fixed frame or supporting members 4 and 5 respectively. The members 2 and 3 are of a material such as rubber or rubber composition, or suitable wood or plastic material to provide a termination for the magneto-striction rod 1, sufficient to absorb its magneto-striction wave energy without reflection; that is, the members 2 and 3 have an impedance to the mechanical form of wave in rod 1, which matches the impedance of the rod. The terminations 2 and 3 may be attached to the butt ends of the rod by suitable means such as a glue or cement at 6 and 6a, and similarly cemented or attached to the fixed supports at 7.

In the practice of our invention, we associate with the rod a coil 8, preferably of short axial dimension, and it will ordinarily be desirable to place this coil around the rod at or near one end thereof, as shown. We connect across the terminals of this coil, the output terminal of a suitable electric wave generator, for example, the pulse generator P. The generator P may be of any well known type capable of delivering to the coil successive pulses at some established frequency, as is well known in the art. Preferably there is shunted across the coil a resistor 8a of a suitable value to broaden the frequency transmission band of the coil to any desired amount, so that it readily transmits the frequency range required to form the shape of the pulse, as is well understood in the art.

We further apply to the rod 1 a number of other coils, 9, 10 and 11, at spaced distances along the rod. These coils 9, 10 and 11 are pickup coils adapted to pick up energy from the rod and deliver it to a receiving device or system. The output of coil 9 is connected to the grid 12 and cathode 13 respectively, forming the input circuit of a vacuum tube 14, the output of which is taken from the anode 15. There is connected in series with the coil 9 in the grid-cathode circuit of the tube, a polarizing battery or suitable D. C. source of potential 16, for the purpose of applying a polarizing magneto motive force to the magneto-striction rod 1. Such polarizing potential need not necessarily be included in the particular circuit of coil 9, but it should be applied in some way or to some coil associated with the rod, unless the rod be polarized in some other way; and it can conveniently be applied to the coil 9. Resistor 21 is connected across the input of the tube and the input voltage is developed across this resistor. Its resistance should be high compared to the impedance of coil 9. Resistor 17, in circuit with battery 18, has the output voltage developed across it, the battery 18 serving to energize the anode 15. Terminals 19 and 20 are output terminals from the tube.

Coils 10 and 11 similarly have connected to them receiving circuits similar to that connected to coil 9. The same numbers are used to designate the elements in the receiving circuits of coils 10 and 11, which correspond with those in the receiving circuit of coil 9, except that the subscript $a$ is applied to the numerals in the receiving circuit of coil 10, and the subscript $b$ is applied to the numerals in the receiving circuit of coil 11. It will be understood that any greater or lesser number of coils 9, 10, 11 may be placed at different positions along the rod.

The spacing between coil 8 and coil 9 is indicated as $L_1$; the distance between coil 8 and coil 10 as $L_2$, and the distance between coil 8 and coil 11 as $L_3$. This distance will determine the delay in receipt of energy at respective receiving coils 9, 10 and 11.

Fig. 1a shows a modification of the arrangement in Fig. 1 in which piezoelectric crystals are used in place of the coils in Fig. 1. Thus the crystal 40 is the input element and crystals 41, 42 and 43 are the output elements. The circuits attached to the crystals are not shown, but these may be similar to those attached to the coils in Fig. 1. The energy impressed on input crystal 40 produces the magneto-striction effect in the rod in a manner similar to that produced by coil 8 in Fig. 1, and the magneto-striction energy is received with the time delay at the receiving crystals 41, 42 and 43.

Fig. 2 shows another modification of the arrangement shown in Fig. 1. In Fig. 2, the magneto-striction rod 1, instead of being terminated by impedance-matching termination devices, such as 2 and 3 in Fig. 1, is terminated directly at its ends by the fixed supports 4 and 5 respectively. The connections to the supports may be made by suitable cement or otherwise. As the solid supports will have a mechanical impedance which does not match the mechanical impedance of the magneto-striction rod, there would ordinarily be produced wave reflections at the terminations. To prevent such wave reflections, there is wound around the rod near each termination, coils 22 and 23 respectively, which have their terminals closed by impedances or resistors 24 and 25 respectively. The resistors 24 and 25 are of sufficiently low impedance as to absorb considerable electrical energy induced in their respective coils. By making the value of these resistors correct, the effect is to produce a damping at the position of coils 22 and 23 which will have a damping impedance matching the mechanical impedance of the rod, and thus preventing undesired wave reflections at the ends of the rod.

Fig. 2a shows a modification which may be used in place of either or both energy absorbing coils 22 and 23 in Fig. 2. In Fig. 2a, a pair of coils 45 and 46 are used, coil 45 being a primary coil inductively related to the secondary 46. The terminals of coil 45 are shunted by a suitable resistor 47 and connected between ground and the grid 49 of a vacuum tube 48. The input circuit is completed to cathode 50 from ground through the parallel-arranged resistor 51 and condenser 52. The secondary coil 46 has one of its terminals connected to the end of a potentiometer resistance 53, and its other terminal connected to the adjustable tap 54 of the potentiometer. The remaining end of the potentiometer is connected to anode 55. Anode voltage is supplied from a suitable source 56. Coil 46 is wound in relation to coil 45, so that the electric pulse from the rod generated in coil 45, operating through the vacuum tube, generates a similar pulse in coil 46 which is 180° out of phase with the pulse in coil 45, thereby effectively cancelling the pulse so that no reflection will occur at the end of the bar.

Apart from the change in the termination, the rod in Fig. 2 may be used in the same way as in Fig. 1. Thus, energy from pulse generator P may be applied to an input coil 8, and coils 9, 10, and any others applied to the rod may be used to take off energy, the specific receiving elements for these pick-up coils not being shown in the figure.

From the foregoing description, it will be understood that wave energy applied at input coil 8 will be converted into the magneto-striction type of energy, which will travel as an impulse or wave down the rod from coil 8, and the traveling rate is approximately that of sound, that is about 1050 feet per second. Thus, there will be a delay in the arrival of the magneto-striction energy at the several coils 9, 10, 11 as determined by their respective distances $L_1$, $L_2$ and $L_3$, from the input coil 8.

The effect is graphically shown in Fig. 3, wherein the ordinates represent voltage from the pulse generator P, and the abscissas represent time. Thus, the pulse generator is considered to generate a series of output pulses $P_1$, $P_2$, $P_3$ and $P_4$, spaced apart by a time interval determined by the frequency of the generator, in a manner well understood in the art. This electrical pulse energy is converted to corresponding electro-magnetic energy, and owing to the magneto-striction characteristic of the rod, this energy reaches the first receiving coil 9 with time delay. Thus, the pulse $P_1$ induces into coil 9 a corresponding electrical pulse $P_{a1}$ at a time $t_1$ after it was applied to coil 8. Pulse $P_2$ similarly produces in coil 9 a pulse $P_{a2}$; pulse $P_3$ produces pulse $P_{a3}$, and pulse $P_4$ produces pulse $P_{a4}$; all with the same time delay $t_1$.

Similarly there are induced in coil 10 pulses $P_{b1}$, $P_{b2}$, $P_{b3}$ and $P_{b4}$, these being at a longer time delay $t_2$ after their initiating pulses $P_1$, $P_2$, $P_3$ and $P_4$. Similarly, in coil 11, there are induced pulses $P_{c1}$, $P_{c2}$, $P_{c3}$ and $P_{c4}$, etc. with a time delay $t_3$.

Fig. 4 illustrates a system utilizing the arrangement of our invention. The system illustrated is a multiplex signal transmission system utilizing a system of pulses in a well known manner to transmit signal intelligence. The pulse generator P transmits a series of pulses at timed intervals, these being the synchronizing pulses of the system. They may be transmitted from the transmitter to a receiver either over a transmission line or by radio wave propagation. The transmitted pulses are indicated in Fig. 4a by the first of the series marked $P_1$ and $P_2$.

In this system, a number of signal channels, A, B, C, and others if desired are simultaneously transmitted; the pulses of the channels being spaced in time from each other and from the synchronizing pulses. To provide this spacing of the pulses, time delay is required, and this time delay is furnished by the device of our invention as shown in Fig. 1 or 2.

The signals for channels A, B, or C are supplied respectively by signal generators or sources $S_a$, $S_b$ and $S_c$. These signal sources may for example be voice currents. Pulses corresponding to those from pulse generator P are supplied over lines 30, 31 and 32 respectively to modulators $M_a$, $M_b$ and $M_c$. The lines 30, 31 and 32 correspond respectively with the output circuit from coils 9, 10 and 11 in Fig. 1. Accordingly, the timing of the pulses in channels A, B and C are progressively delayed from the synchronizing pulses. Thus, in Fig. 4a, the first pulse $P_{a1}$ in channel A is delayed by some time from pulse $P_1$; the first pulse $P_{b1}$ in channel B is delayed by a greater time from the synchronizing pulse $P_1$; and the first pulse $P_{c1}$ in channel C is delayed by a still greater time from pulse $P_1$.

All of these pulses, including the synchronizing pulse may be sent over the same line or transmission medium, and they are spaced in time from each other according to the lower series of pulses marked $P_{a1}$, $P_{b1}$, $P_{c1}$, etc., in Fig. 4a. The criterion is that between each successive pair of synchronizing pulses $P_1$, $P_2$, etc., there must be a corresponding pulse $P_{a1}$, $P_{b1}$, etc., for each channel.

The modulators $M_a$, $M_b$, $M_c$ may be of a known type adapted to produce a form of time or phase modulation. Thus, in Fig. 5, the wave 33 represents a signal wave on one of the channels, for example, the wave supplied by signal source $S_a$. This will be of relatively low frequency compared with the relatively high frequency or short time period of the pulses for the channel. The pulses $P_{a1}$, $P_{a2}$, $P_{a3}$, etc. are indicated above wave 33, to show relative time relations. The effect of this type of modulation is to displace the pulse by a time which varies in accordance with the amplitude of the signal wave. Thus, at a positive amplitude 34 of the signal wave, the pulse $P_{a1}$ may be displaced in time to the position of the dotted line 34a. The greater amplitude 35 at a somewhat later time will produce a somewhat greater displacement of pulse $P_{a2}$ as indicated at 35a. As pulse $P_{a3}$ occurs at the time where wave 33 is at zero potential, this pulse will have no displacement. Amplitude 36 has a negative value, and accordingly the displacement of pulse $P_{a4}$ will be in the opposite direction from the previous displacement, as shown at 36a. Accordingly, the multiplex transmission through the several channels is as indicated on the lower abscissa of Fig. 4a. The dotted lines show the maximum upward displacement of each pulse, in accordance with the modulation, and it will be understood that there will also be correspondingly a lower limit of displacement (not shown).

In receiving transmission over such a multiplex system, a device according to our invention can likewise be used. Such an arrangement is outlined schematically in Fig. 6, wherein the synchronizing channel and the signal channels A, B and C are shown coming into the receiving circuit. The synchronizing pulse may, for example, be applied on coil 8 of the device of Fig.

1. Coils 9, 10, and 11 may then have their outputs sent over lines 37, 38 and 39 to demodulators $D_a$, $D_b$, and $D_c$, for their respective channels. The final receivers $R_a$, $R_b$, and $R_c$ for the demodulated signals of the respective channels are indicated in the figure.

It will be recognized that in accordance with our invention, we have provided a relatively simple device for producing substantial time delays which do not require the use of such elaborate time delay circuits as have heretofore been used in connection with such systems. A great advantage resides in the fact that the velocity of the propagation in the delay medium (the magneto-striction member) is relatively slow compared to the rate of electrical propagation; it is substantially as slow as that of sound, thereby requiring a relatively small delay producing element and without the disadvantage of having to use acoustical-electrical elements as in the case of acoustic delay systems. Furthermore our delay device will transmit much higher frequencies than can be transmitted by such systems as acoustical and mechanical systems.

We claim:

A time delay device comprising a polarized magnetic bar of the type having magneto-striction properties, an input element attached at a point of the bar, said element being of the type which creates magneto-striction energy in the bar in response to electrical energy impressed on the element, an output element attached at a point of the bar spaced at some distance from the input element, said output element being of the type which develops electrical energy in response to the magneto-striction energy passing along the bar, said bar having a coil in magnetic relation with it at an end thereof, the coil being closed through a resistance of value low compared to the impedance of said output element so as to allow enough current to flow in response to the magneto-striction energy in the bar, to absorb all of the magneto-striction energy arriving at said end, the damping impedance of said coil and resistance being matched to the mechanical impedance of said bar.

EMILE LABIN.
DONALD D. GRIEG.

REFERENCES CITED

The following references are of record in the file of this patent:

UNITED STATES PATENTS

| Number | Name | Date |
|---|---|---|
| 2,291,555 | Nyquist | July 28, 1942 |
| 2,401,094 | Nicholson, Jr. | May 28, 1946 |
| 2,401,405 | Bedford | June 4, 1946 |
| 2,403,561 | Smith | July 9, 1946 |